United States Patent [19]
Adam et al.

[11] Patent Number: 5,566,592
[45] Date of Patent: Oct. 22, 1996

[54] ADJUSTING DRIVE, IN PARTICULAR A WINDOW-LIFT DRIVE FOR A MOTOR VEHICLE

[75] Inventors: Peter Adam, Hoechberg; Rudolf Fiedler, Bad Mergentheim, both of Germany

[73] Assignee: Siemens Aktiengesellschaft, München, Germany

[21] Appl. No.: 375,450

[22] Filed: Jan. 19, 1995

[30] Foreign Application Priority Data

Jan. 21, 1994 [EP] European Pat. Off. ............. 94100857

[51] Int. Cl.$^6$ .............................. F16H 57/02; F16H 1/16
[52] U.S. Cl. .............................. 74/606 R; 74/425; 464/89
[58] Field of Search ................... 74/89.14, 425, 74/606 R; 464/89

[56] References Cited

U.S. PATENT DOCUMENTS 5,259,261  11/1993  Michel ...................... 74/425

FOREIGN PATENT DOCUMENTS

0170989A1  7/1985  European Pat. Off. .
3519056A1  12/1986  Germany .
89G3137  3/1989  Germany .

Primary Examiner—Allan D. Herrmann
Attorney, Agent, or Firm—Kenyon & Kenyon

[57] ABSTRACT

An adjusting drive having a gear housing sealed by a gear-housing lid, with a gear wheel or driver rotatably or sluably supported therein. An axial bearing neck is premolded on the gear-housing lid. A radial inner bearing projection concentric to the driver is premolded on the driver and provides a bearing arrangement inside the bearing neck. A radially outer bearing projection is also premolded on the driver and tangentially and sluably supports the gear wheel.

30 Claims, 3 Drawing Sheets

ADJUSTING DRIVE, IN PARTICULAR A WINDOW-LIFT DRIVE FOR A MOTOR VEHICLE

BACKGROUND OF THE INVENTION

The present invention relates to an adjusting drive, and in particular to a window-lift drive for a motor vehicle, having a gear housing, a gear housing lid, and an axial bearing neck.

German Patent Publication No. U-89 03 714 discusses a window-lift drive for a motor vehicle, in which an axial bearing bolt has a first end which is integrally formed, in one piece, with a plastic gear housing. A gear wheel and a drive plate entrained by the gear wheel via a damping spacer are attachably and rotatably supported on an output side, unattached end of the axial bearing bolt. To enable coupling to an outer drive means, in particular to enable coupling to the cable pulley of a window-lift drive for a motor vehicle, the drive plate projects with a sleeve-shaped shaft collar, through an opening in the gear-housing lid to the outside. The sleeve-shaped shaft collar is open on the axial front end. On its periphery, the shaft collar bears a drive sprocket on to which the outer drive means, having a corresponding sprocket, can be attached. The gear wheel abuts axially on the bottom of the gear housing and elastic, flexible tongues of the bearing bolt lock into place behind the front side of the unattached end of the shaft collar thereby axially fixing the gear wheel, or the drive plate directly or indirectly abutting the gear wheel, in position in its final assembly state.

The gear-housing lid can be guided and retained at its outer rim in an axially overlapping fitting rim of the gear housing and can be sealed off by a static seal to be inserted between the gear housing lid and the gear housing. A dynamic seal, in the form of an O-ring, is provided in indentation-type holding devices between the through-opening of the gear-housing lid for the shaft collar of the drive plate and the shaft collar. A similar dynamic seal is provided between the shaft collar and the bearing bolt. The gear housing, the bearing bolt, the drive plate, and the gear wheel are preferably designed as plastic molded parts, to allow all bearing seats to achieve the required rotatable or sluable bearing arrangement without having to be reworked.

The aim of the present invention is to create an adjusting drive which will entail low expenditure for component parts, manufacturing and assembly while guaranteeing high mechanical strength as well as reliable sealing action against ingressing moisture.

SUMMARY OF THE INVENTION

The present invention solves the aforementioned objective by providing an adjusting drive including a gear housing, a gear housing lid, a drive plate, and a drive-side gear wheel. The gear housing lid seals off the gear housing and includes an axial bearing neck which projects axially into the gear housing and which is attached to the gear-housing lid. The drive plate has a radially inner axial bearing projection and a radially outer axial bearing projection. The radially inner axial bearing projection rotatably supports the drive plate on the axial bearing neck of the gear-housing lid. The radially outer axial bearing projection is attached radially on the outside to the drive plate, concentrically to the bearing neck. The gear wheel is supported, in a tangentially displaceable manner, on the radially outer axial bearing projection of the drive plate. The axial bearing neck provides a rotatable or sluable, concentric bearing arrangement for the drive-side gear wheel and for the drive plate.

The axial bearing neck is preferably a sleeve-shaped bearing neck and is preferably a one-piece component of the gear-housing lid. The gear-housing lid may be formed from a metal bending or a drawn sheet-metal blank, or may be a plastic injection-molded part which has modified frictional properties and which is free of a strengthening admixture.

The bearing neck preferably includes elevations and depressions that alternate in a meander form over its circumference. The drive plate is rotatably supported with its radially inner bearing projection in the area of the depressions on the bearing neck. Interspaces between the peripheral surface of the radially inner bearing projection and the bearing neck in the area of the elevations are lubricant stores.

The radially inner bearing projection preferably extends with one unattached end in a direction opposite the unattached end of the bearing neck and is joined at its other end by an essentially radial connection to the second bearing projection.

The drive plate preferably includes driving tabs having axially extending unattached ends which mate axially with the gear wheel. The driving tabs are secured with their other ends on the side of the gear-housing lid to the radially outer bearing projection.

The radially inner bearing projection, the radially outer bearing projection, the driving tabs, and their interconnections are preferably one-piece parts of the drive plate. The drive plate may be a plastic injection-molded part and the gear housing may be a plastic injection-molded part having a strengthening admixture, such as a fiberglass admixture. The gear housing can also be a die-cast aluminum part.

The radially inner bearing projection of the drive plate is preferably designed as a coupling for other outer drive means, such as a window-lift drive for a motor vehicle. The radially inner bearing projection has a supporting part which projects through the gear-housing lid thereby further bracing and bearing the driver external to the gear unit.

The first bearing projection preferably has a pot-like form with a front-side sealing of its sleeve-shaped inner wall at its axial unattached end.

A static seal rests against a sealing surface of the gear housing and is retained on the gear-housing lid on the side of the outer-rim area. The static seal is preferably extruded on the sealing surface of the gear housing. A dynamic seal rests against the inner circumferential surface of the second bearing projection of the drive plate and is retained on the outer circumferential side of the bearing neck. The dynamic seal is preferably injected on the outer circumferential side of the bearing neck.

The drive plate and the gear wheel axially abut against one another and against the adjacent gear housing and the adjacent gear-housing cover, respectively. Axially projecting abutment ribs, having lubricant stores occluded between two abutment ribs, are premolded on at least one of the drive plate, the gear wheel, the gear housing, and the gear-housing lid, to provide axial bracing.

By designing the gear-housing lid as a supporting member responsible for the rotatable or swivel-type bearing arrangement for the gear wheel and the drive plate, the present invention allows the gear housing to be manufactured with little expense using plastic injection-molding technology, including fiberglass reinforcement not suited for a bearing arrangement, or as a die-cast aluminum housing, without necessitating a reworking of the bearing seat. Moreover, this also allows the gear-housing lid, which requires only little mechanical strength compared to the gear housing, either to be manufactured as a simple bending or deep-drawn sheet-metal blank with a simultaneously formed bearing seat or to be manufactured out of plastic having modified frictional properties without having to admix fiberglass or the like, which increases strength and is thus unsuitable for a bearing seat.

Since the first axial bearing projection of the drive plate is supported radially inside the bearing neck of the gear-housing lid, the output side end of the first axial bearing projection can be closed in one piece at the front end. In this way, the preferably plastic-extruded drive plate can be simply released from a mold using molding stamps that are only movable in the axial direction. Moreover, only one single dynamic seal is needed between the periphery of the bearing neck and the inner circumferential surface of the second axial bearing projection of the drive plate to seal off the entire gear housing from ingressing external moisture. A second single static seal is provided between the outer rim of the gear-housing lid and an outer rim-side sealing surface of the gear housing.

To axially fix the components of the gear wheel, which are disposed indirectly or directly in front of one another in the final assembly state, on the one hand, and to axially fix the drive plate, on the other hand, these components are braced against the adjacent part of the gear housing and of the gear-housing lid. Abutment ribs, which run in pairs and preferably occlude lubricant stores between them, are expediently simultaneously premolded, especially extruded, on the drive plate, the gear wheel, the gear housing, and/or on the gear-housing lid, to reduce friction.

DETAILED DESCRIPTION

Figure 1:
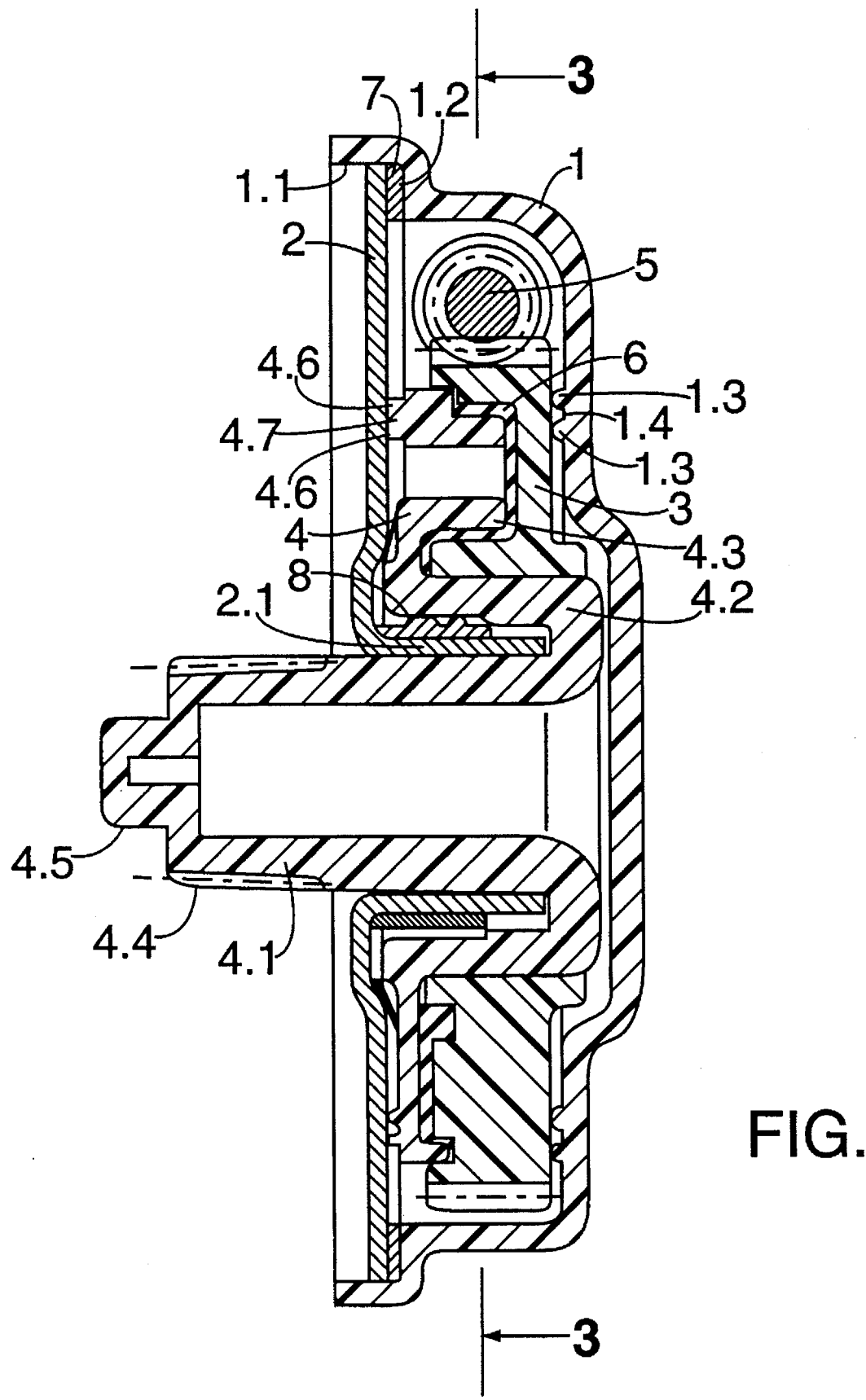
FIG. 1 is a cross-sectional side view of a first exemplary embodiment of a window-lift drive for a motor vehicle of the present invention, in a section through the gear housing along the line of intersection I—I in FIG. 3.

The rotor shaft of a commutator motor, which is extended as a worm shaft 5, projects into the gear housing 1. The gear housing 1 is flange-mounted on the motor housing of the commutator motor and is sealed by a gear-housing lid 2. The worm shaft 5 meshes with a gear wheel 3, which, in turn, entrains a drive plate 4. Specifically, axially projecting driving tabs 4.3, distributed over the circumference of the drive plate 4, engage corresponding companion openings of the gear wheel 3 by way of a damping liner 6. Accordingly, when the gear wheel 3 initiates a driving of the drive plate 4, the damping liner 6 permits the gear wheel 3 to drive the drive plate 4 gently and not abruptly.

For the rotatable or swivel-type bearing arrangement of the gear wheel 3 or of the drive plate 4, a bearing neck 2.1, projecting axially into the gear housing 1, is advantageously premolded in one piece on the gear-housing lid 2. The bearing neck 2.1 is preferably sleeve shaped. The gear-housing lid 2 and the bearing neck 2.1 can be premolded in one piece. In a first refinement of the present invention, the gear-housing lid 2 and the bearing neck 2.1 are formed by a metal bending or drawn sheet-metal blank. According to another refinement of the present invention, the gear-housing lid 2 and the bearing neck 2.1 are formed of a plastic injection-molded part that preferably has modified frictional properties and is free of a strengthening admixture. A bearing seat of this type can guarantee long operational service life for the components that it rotatably or sliably supports, even without having to rework the deep-drawn, or punched, or injection-molded components mentioned above.

To accommodate the bearing or swivelling of the gear wheel 3 or of the drive plate 4 using simple manufacturing and assembly technology, a first axial, preferably sleeve-shaped, bearing projection 4.1 is premolded radially inward of, and concentric to, the bearing neck 2.1 of the gear-housing lid 2. A second axial, preferably sleeve-shaped, bearing projection 4.2 is premolded radialy outward of, and concentric to, the bearing neck 2.1 of the gear-housing lid 2. The first and second axial bearings are formed in one piece. The drive plate 4 is rotatably supported on the bearing neck 2.1 of the gear-housing lid 2 with its radially inner bearing projection 4.1. The gear wheel 3 is supported, in a tangentially displaceable manner, on the radially outer bearing projection 4.2 of the drive plate 4.

Figure 2:
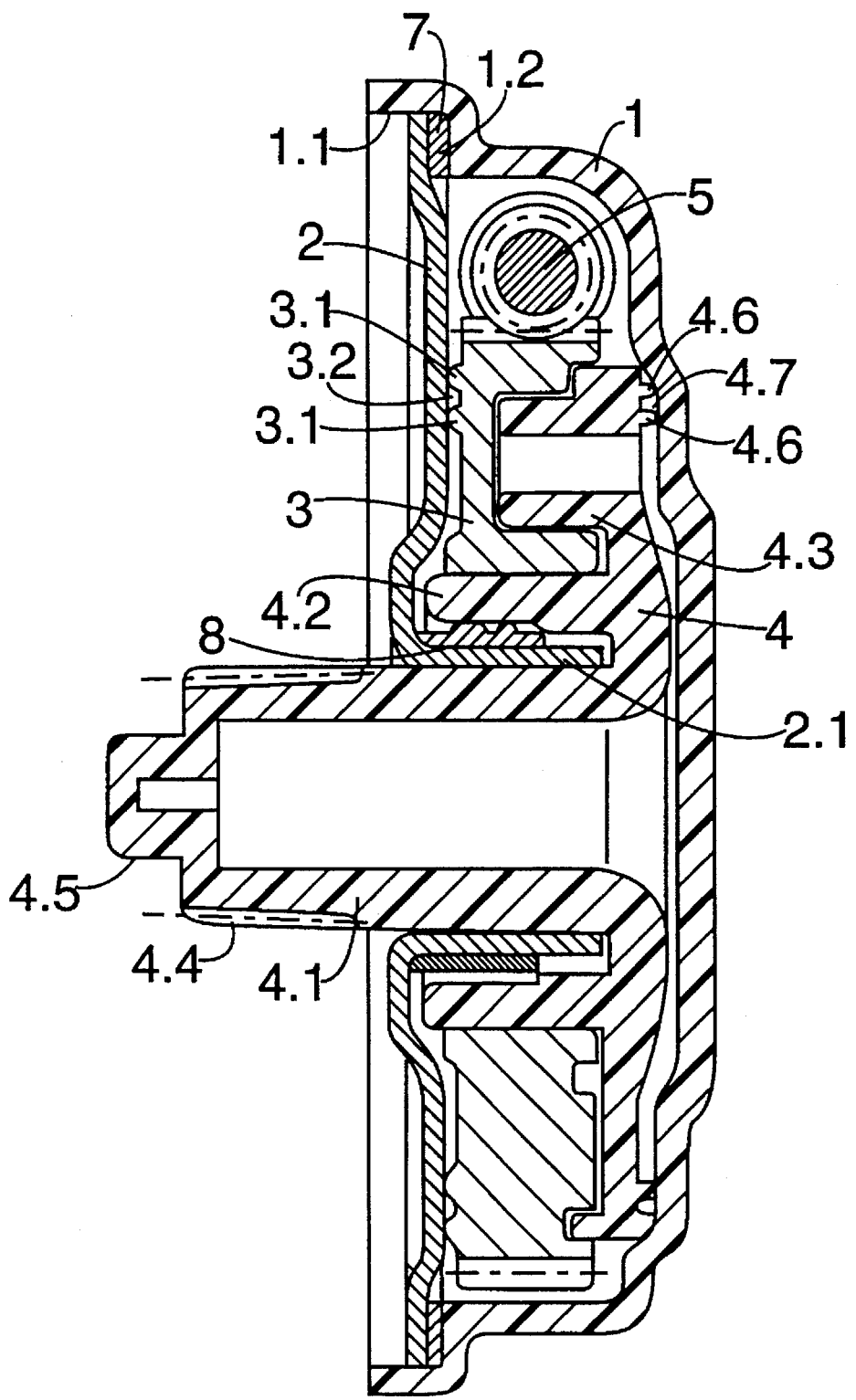
FIG. 2 is a cross-sectional side view of a second exemplary embodiment of a window-lift drive for a motor vehicle in accordance with the present invention.
Figure 3:
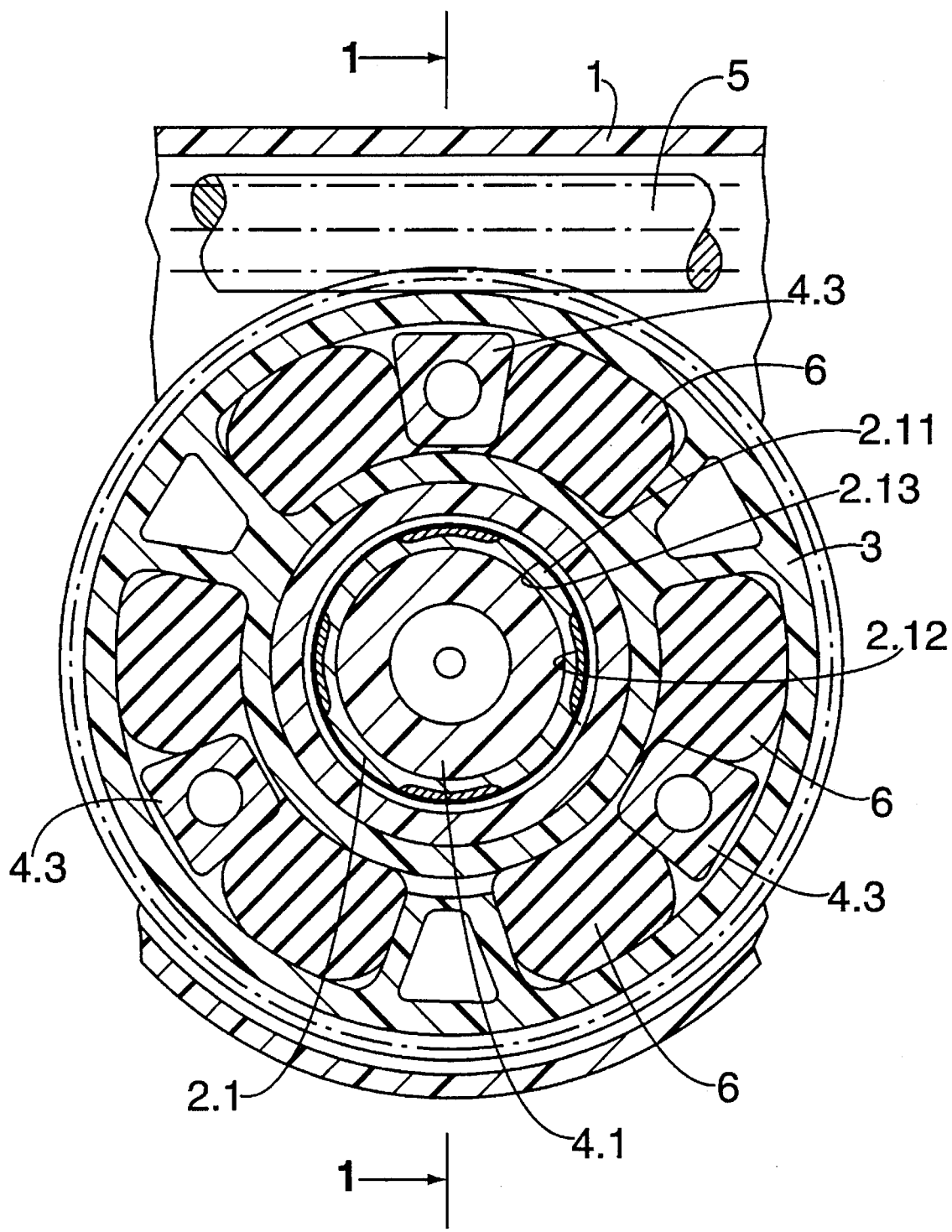
FIG. 3 is a cross-sectional end view of the first exemplary embodiment of a window-lift drive according to the present invention, in a section along the line of intersection III—III in FIG. 1.

One unattached end of the first axial bearing projection 4.1 of the drive plate 4 extends in a direction opposite to the direction in which the unattached end of the bearing neck 2.1 of the gear-housing lid 2 extends. The other end of the first axial bearing projection 4.1 is joined, by way of an essentially radial connection, to the second bearing projection 4.2 of the drive plate 4. This arrangement simplifies assembly. According to a first exemplary embodiment of the present invention depicted in FIG. 1, the driving tabs 4.3, project axially from the drive plate 4 and mate with the gear wheel 3 with their unattached ends. The other ends of the driving tabs 4.3 (i.e., the ends on the side of the gear-housing lid 2) are secured to the radially outer bearing projection 4.2. According to a second exemplary embodiment of the present invention depicted in FIG. 2, the driving tabs 4.3, which mate with the gear wheel 3, are secured with their other ends (i.e., their ends on the side of the gear-housing bottom) to a radially outer bearing projection 4.2, preferably in one piece with the drive plate 4. The drive plate 4 with its driving tabs 4.3 and bearing projections 4.1, 4.2 is preferably manufactured, inter alia, as a one-piece plastic injection-molded part.

According to another refinement of the invention, the radially inner bearing projection 4.1 of the drive plate 4 is designed as a coupling (i.e., includes an integral coupling) 4.4 for other outer driving means, in particular for a window-lift drive for a motor vehicle. For this purpose, the radially inner bearing projection 4.1 projects through an opening in the gear-housing lid 2 to the outside and is provided, on its periphery, with an outer sprocket 4.4. A corresponding inner toothing of an attachable cable pulley of a cable-operated window lifter for a motor vehicle can be attached to the outer sprocket 4.4. The inner bearing projection 4.1, which is preferably designed in a sleeve shape, has a pot-like form with a preferably one-piece, front-side sealing of its sleeve-shaped inner wall at its axial unattached ends. This sealing prevents moisture from penetrating into the interior space of the sleeve-shaped bearing projection 4.1. At the same time, the seal on the side of the pot bottom of the sleeve-shaped bearing projection 4.1 is designed in the shape of a projecting supporting part 4.5 for a further bracing or bearing of the driver 4 external to the gear housing.

To seal off the gear simply and with few component parts, and in particular to prevent the ingression of external moisture, a static seal 7, which rests against a sealing surface 1.2 of the gear housing 1, is retained on (and in particular, is extruded on) the outer rim area of the gear-housing lid 2 which is inserted radially within an overlapping fitting rim 1.1 of the gear housing 1. Further, a dynamic seal 8, which rests against the inner circumferential surface of the second bearing projection 4.2 of the drive plate 4, is retained on (and in particular injected on) the outer circumferential side of the bearing neck 2.1.

A constant, low frictional torque can be achieved, even for a long service life, between the components which are moved or swiveled in the gear housing 1 because the bearing neck 2.1 is designed with elevations 2.11 or depressions 2.12 that alternate in a meander form over its circumference, because the drive plate 4 is rotatably supported with its radially inner bearing projection 4.1 in the area of the depressions 2.12 on the bearing neck 2.1, and because the interspaces 2.13 between the peripheral surface of the radially inner bearing projection 4.1 and the bearing neck 2.1 in the area of the elevations 2.11 are provided as lubricant stores and are filled with a lubricant.

During assembly of the gear, the individual component parts are inserted in the gear housing 1 in a so-called mounting assembly. The gear housing 1 is sealed by the gear-housing lid 2 abutting on the gear housing 1 on the side of the outer rim and is fitted by means of the fitting rim 1.1. The drive plate 4 or the gear wheel 3 abut, in the sense of an axial bracing directly or indirectly, on the one hand, against one another and against the respective adjacent gear housing 1 or gear-housing cover 2. On the other hand, axially projecting abutment ribs 1.3, 3.1, and 4.6, are advantageously premolded on the drive plate 4, or the gear wheel 3, or the gear housing 1, or the gear-housing lid 2 to provide for a point-by-point, axial bracing. The axially projecting abutment ribs 1.3, 3.1 and 4.6 preferably have lubricant stores, provided between them at recesses 1.4, 3.2, and 4.7 defined by the ribs 1.3, 3.1, and 4.6, respectively.

The present invention was explained in the foregoing as a window-lift drive for a motor vehicle. In a similar fashion, the adjusting drive according to the present invention can be used in a in sunroof drive units, seat-adjustment drives and the like.

What is claimed is:
1. An adjusting drive comprising:
 a) a gear housing;
 b) a gear-housing lid, the gear housing lid,
  i) sealing off the gear housing, and
  ii) including an axial bearing neck, the axial bearing neck,
   projecting axially into the gear housing, and
   being attached to the gear-housing lid;
 c) a drive plate, the drive plate
  i) having a radially inner axial bearing projection, the radially inner axial bearing projection rotatably supporting the drive plate on the axial bearing neck of the gear-housing lid, and
  ii) having a radially outer axial bearing projection, the radially outer axial bearing projection attached radially on the outside to the drive plate, concentrically to the bearing neck; and
 d) a drive-side gear wheel, the gear wheel being supported, in a tangentially displaceable manner, on the radially outer axial bearing projection of the drive plate,
 wherein the axial bearing neck provides a rotatable, concentric bearing arrangement for the drive-side gear wheel and for the drive plate.

2. The adjusting drive of claim 1 wherein the axial bearing neck is a sleeve-shaped bearing neck.
3. The adjusting drive of claim 1 wherein the bearing neck is a one-piece component of the gear-housing lid.
4. The adjusting drive of claim 3 wherein the gear-housing lid is formed from at least one of a metal bending and a drawn sheet-metal blank.
5. The adjusting drive of claim 1 wherein the gear-housing lid is formed from at least one of a metal bending and a drawn sheet-metal blank.
6. The adjusting drive of claim 3 wherein the gear-housing lid is a plastic injection-molded part.
7. The adjusting drive of claim 6 wherein the gear-housing lid has modified frictional properties and is free of a strengthening admixture.
8. The adjusting drive of claim 1 wherein the gear-housing lid is a plastic injection-molded part.
9. The adjusting drive of claim 8 wherein the gear-housing lid has modified frictional properties and is free of a strengthening admixture.
10. The adjusting drive of claim 3 wherein the bearing neck includes elevations and depressions that alternate in a meander form over its circumference.
11. The adjusting drive of claim 10 wherein the drive plate is rotatably supported with its radially inner bearing projection in the area of the depressions on the bearing neck.
12. The adjusting drive of claim 10 wherein interspaces between the peripheral surface of the radially inner bearing projection and the bearing neck in the area of the elevations are lubricant stores.
13. The adjusting drive of claim 1 wherein the bearing neck has an unattached end and the radially inner bearing projection extends with one unattached end in a direction opposite the unattached end of the bearing neck and is joined at its other end by an essentially radial connection to the radially outer bearing projection.
14. The adjusting drive of claim 13 wherein the drive plate includes driving tabs having axially extending unattached ends, the axially extending unattached ends of the driving tabs mating axially with the gear wheel, the driving tabs being secured with their other ends on the side of the gear-housing lid to the radially outer bearing projection.
15. The adjusting drive of claim 13 wherein the drive plate includes driving tabs having axially extending unattached ends, the axially extending unattached ends of the driving tabs mating axially with the gear wheel, the driving tabs being secured with their other ends on the side of the gear-housing bottom to the radially outer bearing projection.
16. The adjusting drive of claim 13 wherein the radially inner bearing projection, the radially outer bearing projection, the driving tabs, and their interconnections are one-piece parts of the drive plate.
17. The adjusting drive of claim 16 wherein the drive plate is a plastic injection-molded part.
18. The adjusting drive of claim 1 wherein the gear housing is a plastic injection-molded part having a strengthening admixture.
19. The adjusting drive of claim 18 wherein the strengthening admixture is a fiberglass admixture.
20. The adjusting drive of claim 1 wherein the gear housing is a die-cast aluminum part.
21. The adjusting drive of claim 1 wherein the radially inner bearing projection of the drive plate is designed as a coupling for other outer drive means.
22. The adjusting drive of claim 21 wherein the other drive means is a window-lift drive for a motor vehicle.
23. The adjusting drive of claim 1 wherein the radially inner bearing projection has a supporting part, the supporting part projecting through the gear-housing lid thereby further bracing and bearing the driver external to the gear unit.

24. The adjusting drive of claim 1 wherein the radially inner bearing projection has a sleeve-shaped inner wall and has a pot-like form with a front-side sealing of its sleeve-shaped inner wall at an axially unattached end.

25. The adjusting drive of claim 1 further comprising a static seal, the static seal resting against a sealing surface of the gear housing and being retained on the gear-housing lid on the side of the outer-rim area.

26. The adjusting drive of claim 25 wherein the static seal is extruded on the sealing surface of the gear housing.

27. The adjusting drive of claim 1 further comprising a dynamic seal, the dynamic seal resting against the inner circumferential surface of the radially outer bearing projection of the drive plate and being retained on the outer circumferential side of the bearing neck.

28. The adjusting drive of claim 1 wherein the dynamic seal is injected on the outer circumferential side of the bearing neck.

29. The adjusting drive of claim 1, further comprising a gear-housing cover adjacent to the gear housing, wherein the drive plate and the gear wheel axially abut against one another and against the adjacent gear housing and the adjacent gear-housing cover, respectively.

30. The adjusting drive of claim 29 wherein axially projecting abutment ribs, having lubricant stores occluded between two abutment ribs, are premolded on at least one of the drive plate, the gear wheel, the gear housing, and the gear-housing lid, to provide for axial bracing.

* * * * *